US006561069B2

(12) United States Patent
Krauss et al.

(10) Patent No.: US 6,561,069 B2
(45) Date of Patent: May 13, 2003

(54) CUTTING DEVICE, IN PARTICULAR FOR CUTTING FOODSTUFFS

(75) Inventors: Dieter Krauss, Markt Rettenbach (DE); Alexander Joedecke, Kempten (DE); Roland Glänzer, Wiggensbach (DE); Roland Kurtz, Legau (DE); Ralf Peter Müller, Kempten (DE); Michael Allgayer, Pfronten (DE)

(73) Assignee: CFS GmbH Kempten, Kempten (DE)

( * ) Notice: Subject to any disclaimer, the term of this patent is extended or adjusted under 35 U.S.C. 154(b) by 0 days.

(21) Appl. No.: 09/887,362

(22) Filed: Jun. 25, 2001

(65) Prior Publication Data

US 2001/0054345 A1 Dec. 27, 2001

(30) Foreign Application Priority Data

Jun. 23, 2000 (DE) ........................................ 100 30 691

(51) Int. Cl.[7] ............................ B23D 19/00; B26D 1/18

(52) U.S. Cl. .......................... 83/490; 83/471.1; 83/646; 83/932

(58) Field of Search ................................ 83/490, 471.1, 83/932, 713, 646

(56) References Cited

U.S. PATENT DOCUMENTS

| | | | | | |
|---|---|---|---|---|---|
| 315,513 | A | * | 4/1885 | Kidder | |
| 1,778,875 | A | * | 10/1930 | Van Berkel | |
| 2,573,860 | A | * | 11/1951 | Meeker et al. | |
| 4,584,917 | A | * | 4/1986 | Blom | 83/174 |
| 4,691,749 | A | * | 9/1987 | Reuter | |

* cited by examiner

*Primary Examiner*—Derris H. Banks
*Assistant Examiner*—Ali F Abdelwahed
(74) *Attorney, Agent, or Firm*—Jacobson Holman PLLC

(57) ABSTRACT

The invention relates to a cutting device for products, in particular for cutting up foodstuffs. A blade driven by a drive shaft so as to rotate is provided which orbits a further drive shaft in a planetary path-like manner on a rotor driven by the further drive shaft. For a compact arrangement it is provided that the one drive shaft is designed as a hollow shaft and that the other drive shaft is guided therein.

13 Claims, 3 Drawing Sheets

CUTTING DEVICE, IN PARTICULAR FOR CUTTING FOODSTUFFS

FIELD OF THE INVENTION

The invention relates to a cutting device for products, in particular for cutting foodstuffs, which consists of a blade driven by a drive shaft so as to rotate and a rotor driven by a further drive shaft. The blade orbits the further drive shaft of the rotor in a planetary path-like manner.

DESCRIPTION OF THE RELEVANT ART

Cutting devices of this type are used to cut up foodstuffs, such as lengths of sausages prepared on an industrial scale (length up to 160 cm), at high speed. For this purpose, the sausage is supplied to a rotating blade in the direction of the axis of rotation of the blade by a conveying means, for example a moving support face of a transport claw acting at the end or conveyor belts acting laterally/from above and is cut up into individual slices during this supply process by the rotating blade. Circular blades are preferably used in the above-mentioned cutting devices. The circular blades do not have any unbalanced mass with respect to their drive shaft, whereby the mounting of the blade rotating at high speed is greatly facilitated. The blade must be moved such that it periodically exposes the cutting region for the subsequent supply of the foodstuff article to be cut up. For this purpose the blade is arranged on the rotor with its axis of rotation such that, in addition to its own rotation, it rotates on a planetary path round the further drive shaft of the rotor.

In a cutting device of this type the rotating rotor is driven by a drive belt which is located, for example, round the outside of the rotor. In FIG. 1, which shows a cutting device according to the state of the art, an example of a drive of this type by means of drive belts is indicated by the arrow designated by the reference numeral 6. The blade 1 rotating in the opposite direction is driven by a drive shaft 3 and a driven shaft 4, which are connected to one another by a gearing, at the back of the rotor 2. The drive belt, which, for example, can be a toothed belt, is housed together with the rotor 2 inside a housing 7 in a drive region 8 of the cutting device. This housing 7 is separated from the product at the blade-side, i.e. at the transition of the drive region into a product region 9, by a cover 10, as shown in FIG. 1, wherein such a cover 10 must of course have a recess of the size of the cross-section of the rotor 2. As the rotor 2 is in a constantly rotating state, a seal at the gap 11 between the cover and the rotor and toward the product region is only, if at all, inadequately possible. Therefore, the cover 10 has only a limited separating function between the product region 9 and the drive region 8 in which the drive belt and the rotor 2 are located. An accumulation of product scraps, which fall off during the cutting process, inside the drive housing and therefore inside the drive region is therefore unavoidable.

Owing to gravity, such product scraps, such as cutting residue, together with lubricant residue, such as grease from the toothed wheel belts, accumulate in the lower region of the drive housing 7. Dirt particles and water from the high-pressure cleaning process which must be performed at regular intervals on the cutting device in the product region are generally added to this mixture. Cleaning using high-pressure would be a suitable and desirable means for rapid cleaning of the soiled drive region. However, for this purpose it is necessary to dismantle the cover 10 and to make modifications to the drive engineering, in order to provide an open access to the drive region for the cleaning equipment. The disadvantage of such a cleaning process is not only the large amount of time required, but also the complicated handling of the cutting device before the actual cleaning process can be started.

Owing to the portion of the cover 10 located at the bottom and the lower wall of the drive housing adjacent thereto the spacing between the rotor 2 and the product is limited to a necessary maximum value, resulting in a disadvantageous limited maximum value of product cross-section which can be cut, or in larger blades which have to be driven with more energy and which owing to the higher angular momentum lead to larger and therefore also more expensive bearings.

SUMMARY OF THE INVENTION

The object of the invention is therefore to provide a cutting device, in particular for cutting foodstuffs, which has an improved seal with respect to the product to be cut and, in terms of its construction, is easier to clean and is therefore more hygienic.

This object is achieved according to the characterising part of claim 1, for owing to the arrangement of the one drive shaft in the other drive shaft designed as a hollow shaft it is possible to omit the drive belt which is located round the housing of the rotor and instead to supply the entire drive of the cutting device at the back, i.e. the side remote from the product, of the cutting device. This shaft-in-shaft system allows not only the rotating rotor and blade rotating in a planetary path-like manner to be driven simultaneously in a simple way, but also an optimal seal at the entry point of the shaft-in-shaft system into the rotor and therefore a hygienically operable rotor inside the product region of the cutting device.

Owing to the use of the shaft-in-shaft system it is no longer necessary to drive the rotor via a separate toothed belt at the outside of the rotor housing and to drive the blade via a gearing which connects the drive shaft and the driven shaft of the blade and is arranged outside the rotor housing. This results in a simplified form of the rotor and therefore of the entire cutting device produced, which is simpler and also more compact.

In addition, the shaft-in-shaft system results in the decisive advantage of a rotor, including blade, which is freely suspended and closed and sealed in the product region and is separated from the drive region by a partition wall, so mixing of lubricants and product scraps is no longer possible. The cutting device is therefore more hygienic. If a cleaning process is started the freely suspended closed rotor housing, together with the remaining product region, can be cleaned in a straightforward manner by means of a high-pressure cleaner regardless of the drive region and without further preparation measures.

It is advantageous in this case for the drive sources to be separated from the rotor and the blade by a partition wall. The drive sources are connected in the conveying direction of the foodstuff article in the region remote from the blade. As a result, an arrangement which is compact and also makes optimum use of space is selected.

It is provided in a preferred development of the invention that a rotor housing directly faces the product. Owing to this arrangement the additional housing (designated as housing 7 in FIG. 1) known in the state of the art can be dispensed with. This results in an effective cutting edge being arranged closer to the product support with a product type which appears to be identical. Cutting blades can be constructed so as to be smaller with a lower angular momentum. As a result, an associated reduction in construction costs for the mounting thereof can be obtained.

In addition, owing to the arrangement of the rotor in the product region, it is possible to advance the rotor toward the product upper edge without limitation, so product cross-sections of greater dimension can now be cut.

Owing to the arrangement of the connecting devices between drive shaft and driven shaft of the blade inside the closed rotor regular maintenance of this connecting device with lubrication and cleaning thereof is largely unnecessary.

The balance weights required owing to the planetary path-like movement of the blade can now similarly be housed completely within the closed rotor housing. This results in a simplified and more compact external form of the cutting device.

It is of particular advantage in this case that the arrangement of blade counterweights, such as blade counterweight M4 in FIG. 1, can be dispensed with. This impeded operation as it had to be attached in the front product region and interfered during the cutting process in such a way that it struck away the uppermost slice of the cut product slice stack. As a result of the development according to the invention, the blade weights can be housed in the rotor housing so the external blade weight and the disadvantages associated therewith no longer exists.

In a preferred development of the invention it is provided that the drive shaft guided in the hollow shaft drives either the cutting blade or the rotor. The hollow shaft then drives either of the other of the rotor or the cutting blade. In each case it is possible to establish control of the various elements by the two shafts guided one inside the other in accordance with requirements.

In this case it is provided that the drive sources of the hollow shaft or of the drive shaft located therein are either independent electric motors or else that the rotation is derived from a common drive motor, for example by means of gearing. A further drive can be dispensed with as a result of such a development, in particular as, owing to the parallel arrangement of the two shafts, a relatively space-saving, compact arrangement is possible anyway. A separate drive shaft in the form of a gearing is optionally provided as a result of which the torque is derived from the drive motor. It is possible in this case to arrange the gearing in such a way that the shafts run in the same or opposing direction(s). This can, of course, also be achieved by two electric motors appropriately connected in opposing directions.

BRIEF DESCRIPTION OF THE DRAWINGS

Further details, advantages and developments of the invention emerge from the following description of the preferred embodiment and with reference to the drawings, in which.

DETAILED DESCRIPTION

Figure 2:
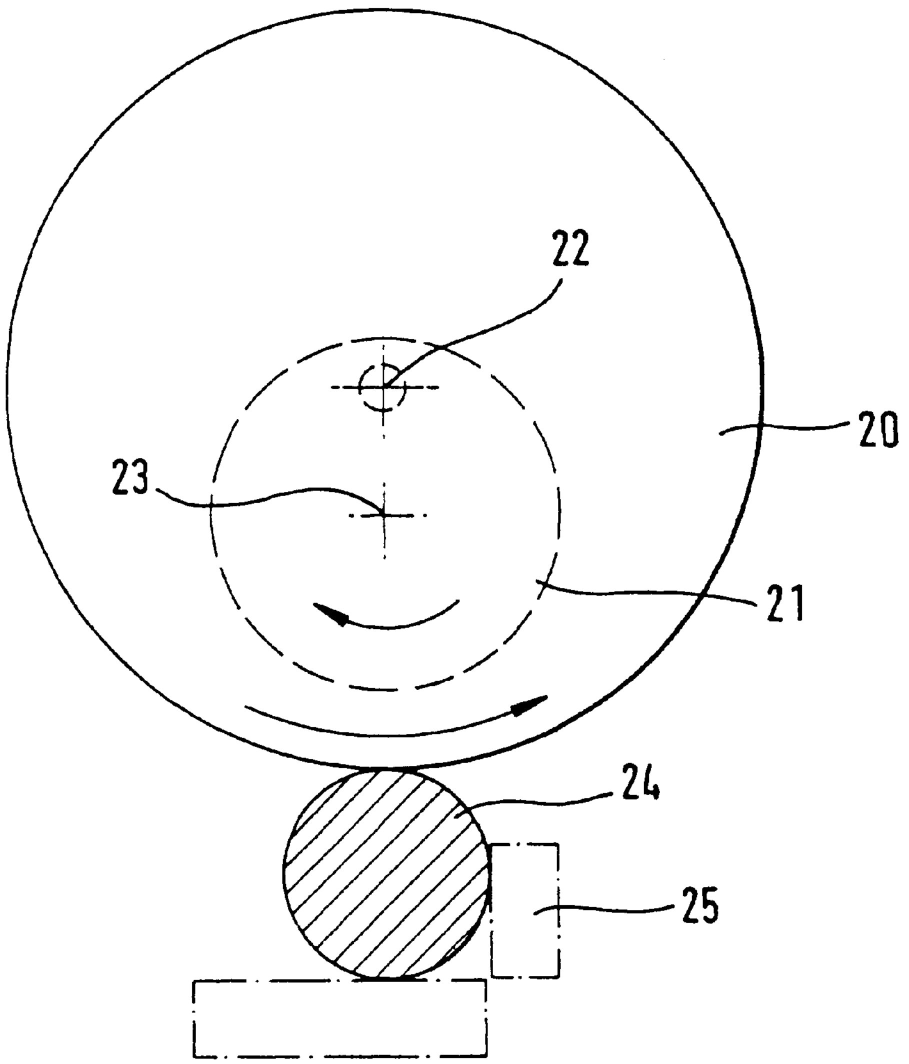
FIG. 2 shows the mode of operation of a cutting device, in particular for cutting foodstuffs.

FIG. 2 shows a simplified view of the construction and mode of operation of cutting devices of this type. A cutting device viewed from the drive side substantially consists of a, for example, circular blade 20 which rotates round a shaft 22 in the direction of the arrow. The shaft 22 is arranged inside a rotor 21 which itself rotates about a central axis 23. The shaft 22, and hence the blade 20, move in a circular planetary path due to the fact that the shaft 22 is arranged radially offset to the central axis 23 of the rotor 21. Rotor and blade rotate in opposing directions as can be seen from the orientations of the direction of rotation arrows inside FIG. 2.

If the lowest point of the planetary path is now reached by the blade owing to the describing planetary path of the shaft 22 and therefore of the blade 20, a slice is cut off from the product 24 arranged on a support table 25 with a holding-down device. Owing to the product constantly moving up in the direction of the cutting device, the cutting up of long products is possible with a blade/rotor system of this type rotating at high speed within a very short time.

Figure 3:
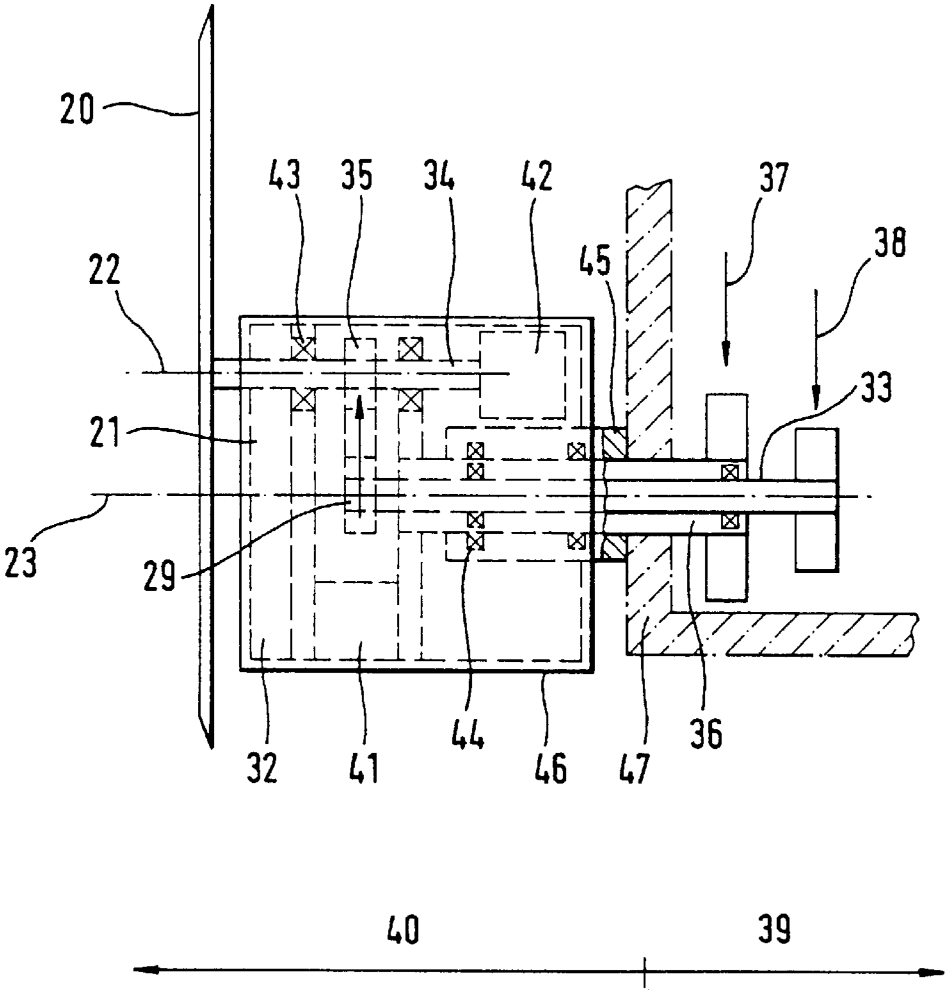
FIG. 3 shows a lateral cross-sectional view of an embodiment of the cutting device according to the invention.

An embodiment of the cutting device according to the invention will now be described in more detail with reference to FIG. 3. The invention can preferably, but not exclusively, be embodied in the form as illustrated in FIG. 3. This embodiment consists of a, for example, circular blade 20 which rotates round a driven shaft 34 arranged in a rotor 32 and offset to the central axis of the rotor 32. The rotor 32 rotating, for example, in the opposite direction to the direction of rotation of the blade 20 rotates round the driven shaft 34 which simultaneously represents the central axis 23 of the rotor 32 and a hollow shaft. A drive shaft 33 for driving the driven shaft 34 of the blade is guided within the hollow shaft 36. The hollow shaft 36 and the drive shaft 33 are supported by means of a hub 45 on and in a partition wall 47 which separates a drive region 39 and a product region 40 from one another. Drive devices, as indicated by the arrows 37 and 38, are provided in the drive region 39 for the hollow shaft 36 and the drive shaft 33 guided therein respectively. These drive device can, for example, be electric motors connected either directly or by means of gearing or a belt drive to the shafts.

Owing to the use of such a shaft-in-shaft system for driving the entire cutting device it is now possible to provide a clean, hygienic and effective separation between drive region and product region, because this shaft-in-shaft system is not only compact, and therefore also leads to a construction of the entire cutting device which is more compact and simpler and therefore easier to clean, but also allows the well-sealed suspension of the rotor and of the blade 31 connected thereto on an individual partition wall 47 which clearly separates drive region 39 and product region 40 from one another. A rotor cover which makes effective sealing between product region and rotor region difficult can automatically be dispensed with as owing to the shaft-in-shaft system for driving the rotor a drive belt is no longer required.

The special construction of the two drive shafts 33 and 36 in accordance with the principle of being guided one inside the other contributes to the fact that the drive shafts simultaneously serve as suspension of the rotor with the blade and as drive for the rotor and the blade. An effective, sealable separation between drive region and product region is only possible owing to such a shaft-in-shaft construction. The separation of the drive region 39 from the product region 40 by such an easily sealed partition wall 47, which represents a component of a housing of the entire cutting device, ensures that lubricants which are indispensable for the friction-free functioning of the force transmission from a motor to the drive shafts, remain within the drive region, and that product scraps from the product region do not enter the drive region and cannot therefore form a mixture of foodstuff scraps and lubricants.

In addition, the arrangement of the partition wall behind the now freely suspended rotor, viewed from the product side, allows closer advancement of the product to the rotor and therefore to the blade as a previously imperative cover directly behind the blade and round the rotor no longer stands in the way of the advancing movement.

The driven shaft 34 of the blade is connected inside the rotor to the drive shaft 33 by, for example, a belt/belt wheel system 35 arranged between two bearings 43 of the driven shaft for torque transmission from drive shaft to driven shaft, as is shown by the arrow associated with the reference numeral 29. However, any other type of belt connection or gearing, provided they are capable of transmitting the torque between two parallel shafts, is also conceivable.

Hollow shaft 36 and the shaft 33 located therein, which can optionally also be used with reversed function, are oriented concentrically and/or parallel or substantially parallel to one another.

Figure 1:
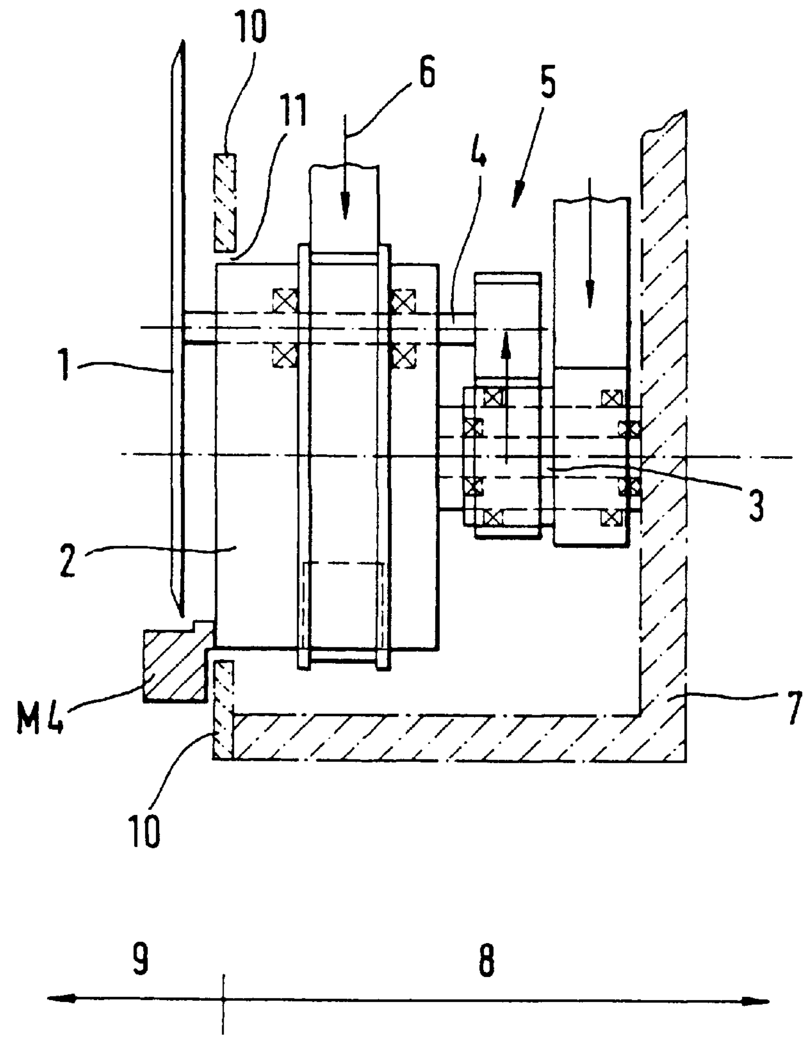
Fig. 1 (PRIOR ART)
FIG. 1 shows a lateral cross-sectional view of a cutting device according to the state of the art.

It can be seen from a comparison of the views of FIG. 1 and FIG. 3 that such a device 5 for transmitting the torque from the drive shaft to the driven shaft in a device according to the state of the art of FIG. 1 is arranged outside the rotor 2 and, more precisely, viewed from the product side, behind the rotor. On the other hand, the cutting device according to the invention of FIG. 3 the drive system 35 for transmitting the torque is arranged inside the rotor housing 46, whereby owing to the closed housing of the rotor the latter is less susceptible to dirt and wear and the number of maintenance operations to be carried out is reduced as a result. In order to obtain a completely maintenance-free rotor with respect to the drive system 35 the latter can be sealed with respect to its environment in the interior of the rotor housing and given a lifetime lubrication. In addition, the drive system 35 is now completely separate from the product region, but also from the drive region, owing to the rotor housing 46, for which reason it can no longer contribute to soiling of the two regions. The rotor housing 46 itself is, for example, a cylindrical, sealed, co-rotating casing of the rotor.

The driven shaft 34 is sealed from the rotor housing 46 at the blade-side by a conventional seal not shown in FIG. 3 in order to prevent entry of product scraps into the rotor housing or an escape of lubricants from the rotor housing into the product region. In order to provide a counterweight to the weight of the blade, which can be produced in the form of a blade disc made of stainless steel alloy, at the other end of the driven shaft for uniform loading of the shaft, at least one weight 42 is arranged at the other end of the driven shaft. This counterweight 42 is, like a counterweight 41, attached inside the rotor housing for a more compact construction of the rotor.

The imbalance or unbalanced mass inside the rotor 32 caused by the displacement of the driven shaft 34 is compensated by means of one or more counterweights 41. Such a counterweight 41 is preferably also arranged offset with respect to the central axis of the rotor 32 but in the opposite direction to the displacement direction of the driven shaft 34, inside the rotor. However, any other position for the arrangement of the weight inside and outside the rotor is also conceivable by appropriate spatial distribution of the weight and selection of the position of the weight distribution. It is therefore possible, for example, for the counterweight 41 to also be displaced in the direction of the drive region by a counterweight 42 which is displaced as far as possible in this direction. This type of arrangement causes an arrangement of counterweights in the front region of the cutting device, i.e. partly in the immediate vicinity of the blade and therefore of the product to be cut, as is shown in FIG. 1 as counterweight M4, to no longer be necessary and a hindrance of the cutting process by such a weight, for example by striking away the uppermost slice of the product from the cut product slice stack, to no longer be possible.

The rotor 32 together with the blade 20 forms a freely suspended, closed unit in the product region which does not have any recesses or areas which are difficult to reach for the deposition of product scraps. As a result, cleaning of the product region with a higher-pressure cleaner after each operation of the cutting device is substantially facilitated. The drive region, on the other hand, does not require regular cleaning anymore as the well-sealed suspension of the shaft-in-shaft construction together with the partition wall 47 provides an optimal separation between drive region and product region.

The driven shaft 34 is effectively mounted at various positions along its longitudinal extension with bearings 43, such as any type of ball bearing or similar. The bearings 44 also ensure a bearing in this case for the two drive shafts 33 and 36. All bearings are sealed in the interior of the rotor housing from their environment and have a lifetime lubrication, so the rotor is maintenance-free with respect to the bearing. Therefore, the only element inside the rotor which requires a lubrication from time to time is the driven shaft 34 itself which is also called the blade shaft.

The blade together with the rotating rotor and the product arranged on a support table can be covered by a protective cover, not shown in the drawings, to protect the user from the rotating blade and product scraps potentially flying around.

The invention relates not only to a cutting device as described at the outset but also extends in the same manner to a foodstuffs processing machine in which the product 24 rests on a product support and is cut up by a cutting device as described at the outset. Such foodstuffs processing machines have long been known as high performance cutting machines or slicers. The development according to the invention allows, in particular, for the space between rotor housing and product support to be optimally used as an additional partition wall, known in the state of the art, can be dispensed with. As a result it is possible, with identical dimensioning of the cutting blade, to arrange a product holding-down device (not shown) in the region directly in front of the cutting blade. As a result of the product holding-down device the product to be cut up is optimally held and guided in front of the cutting blade. As a result of the compact construction of the cutting device these mutually positive influential properties are achieved without having to alter the construction of the cutting device and the masses moved thereby and angular momentums produced thereby.

In a further embodiment (not shown here) it is not the drive shaft of the rotor which is designed as a hollow shaft but that of the blade. Consequently, the drive shaft of the rotor would be guided in the hollow drive shaft of the blade.

The claims filed with the application and claims filed later are attempts at wording without prejudice to achieve extensive protection.

The references made in the dependent claims refer to the development of the subject of the main claim by the features of the respective sub-claim. However, these are not to be understood as a relinquishment of the aim of independent representational protection for the features of the sub-claims referred to.

Features which were previously disclosed only in the description, can in the course of the process be claimed as being of essential importance to the invention, for example as a demarcation from the state of the art.

What is claimed is:

1. A cutting device for cutting foodstuffs, comprising a cutting blade driven by a drive shaft to rotate, said blade orbits a further drive shaft in a planetary path on a rotor driven by the further drive shaft, one of said drive shaft or said further drive shaft is a hollow shaft and the other of the said drive shaft or said further drive shaft is guided therein, and two drive sources for driving said drive shaft and said further drive shaft are arranged in a region separated by a partition wall from the rotor and the blade and remote therefrom.

2. The cutting device according to claim 1, wherein said hollow shaft and the further drive shaft guided therein are arranged inside a hub.

3. The cutting device according to claim 1, wherein said drive shaft is connected to the blade by a parallel and offset driven shaft which is mounted inside the rotor.

4. The cutting device according to claim 3, wherein said offset driven shaft and said drive shaft inside the rotor are connected by a wheel arranged on the offset driven shaft and a belt.

5. The cutting device according to claim 1, wherein a rotor housing directly faces the foodstuffs.

6. The cutting device according to claim 1, wherein said rotor is arranged inside a cylindrical, co-rotating housing.

7. The cutting device according to claim 3, wherein sealing devices are attached between the driven shaft and a housing of the rotor.

8. The cutting device according to claim 3, wherein the driven shaft at a side remote from the blade is subjected to a weight inside the rotor.

9. The cutting device according to claim 3, wherein said rotor is subjected to a counterweight counter to a radial displacement direction of the driven shaft and remote from the further drive shaft.

10. The cutting device according to claim 1, wherein said drive shaft guided in the hollow shaft drives either the cutting blade or the rotor.

11. The cutting device according to claim 1, wherein a direction of rotation of the blade and a direction of rotation of the rotor are opposed.

12. The cutting device according to claim 1, wherein said two drive sources are derived from a common drive motor by means of gearings.

13. Foodstuffs processing machine in which the foodstuffs rests on a product support and is cut up by a cutting device according to claim 1.

* * * * *